(12) United States Patent
Ghose et al.

(10) Patent No.: US 10,387,936 B2
(45) Date of Patent: Aug. 20, 2019

(54) METHOD AND APPARATUS FOR IMPROVING EXPERIENCES OF ONLINE VISITORS TO A WEBSITE

(71) Applicant: [24]7.AI, INC., San Jose, CA (US)

(72) Inventors: Abhishek Ghose, Bangalore (IN); Abir Chakraborty, Bangalore (IN); Prashant Joshi, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 789 days.

(21) Appl. No.: 15/011,439

(22) Filed: Jan. 29, 2016

(65) Prior Publication Data

US 2016/0239897 A1  Aug. 18, 2016

Related U.S. Application Data

(60) Provisional application No. 62/116,237, filed on Feb. 13, 2015.

(51) Int. Cl.
| | |
|---|---|
| *G06Q 30/06* | (2012.01) |
| *H04L 29/08* | (2006.01) |
| *G06F 16/335* | (2019.01) |
| *G06F 16/9535* | (2019.01) |

(52) U.S. Cl.
CPC ....... *G06Q 30/0625* (2013.01); *G06F 16/335* (2019.01); *G06F 16/9535* (2019.01); *G06Q 30/0631* (2013.01); *G06Q 30/0633* (2013.01); *H04L 67/02* (2013.01); *H04L 67/22* (2013.01); *H04L 67/306* (2013.01)

(58) Field of Classification Search
CPC ................................................. G06Q 30/06–08
USPC ................................................ 705/26.1–27.2
See application file for complete search history.

(56) References Cited

U.S. PATENT DOCUMENTS

| | | | |
|---|---|---|---|
| 8,930,294 B2 * | 1/2015 | Anandaraj | G06Q 30/02 706/46 |
| 9,911,130 B1 * | 3/2018 | Battisti | G06Q 30/0631 |
| 2007/0055477 A1 | 3/2007 | Chickering et al. | |

(Continued)

OTHER PUBLICATIONS

User-click Modeling for Understanding and Predicting Search-behavior, Yuchen Zhang, Weizhu Chen, Dong Wang, Qiang Yang, Aug. 21-24, 2011 (Year: 2011).*

(Continued)

*Primary Examiner* — Ming Shui
(74) *Attorney, Agent, or Firm* — Perkins Coie LLP

(57) ABSTRACT

A computer-implemented method and an apparatus for improving experiences of an online visitor visiting a website detects a website access event. A visitor profile is generated by defining a plurality of attributes related to visitor activities on the website. A data field is allocated to each attribute to configure the visitor profile including a plurality of data fields. Each data field is capable of accommodating a respective fixed number of entries determined based on a temporal threshold value computed to determine a number of entries required for storing of information related to past activities that are relevant to current activity of the online visitor on the website. The visitor profile is dynamically updated based on the current activity. At least one intention of the online visitor is predicted based on a state of the visitor profile selected at a chosen time instant during the current activity of the online visitor.

14 Claims, 8 Drawing Sheets

(56) References Cited

U.S. PATENT DOCUMENTS

| | | | |
|---|---|---|---|
| 2008/0214166 A1* | 9/2008 | Ramer | G06Q 30/02 455/414.3 |
| 2013/0246383 A1 | 9/2013 | White et al. | |
| 2014/0143325 A1 | 5/2014 | Lessin et al. | |
| 2014/0207622 A1 | 7/2014 | Vijayaraghavan et al. | |
| 2014/0337685 A1 | 11/2014 | Baptist et al. | |
| 2015/0120856 A1* | 4/2015 | Bennett | H04L 47/10 709/213 |

OTHER PUBLICATIONS

Actively Predicting Diverse Search Intent from User Browsing Behaviors, Zhicong Cheng, Bin Gao, Tie-Yan Liu Apr. 26-30, 2010 (Year: 2010).*

* cited by examiner

METHOD AND APPARATUS FOR IMPROVING EXPERIENCES OF ONLINE VISITORS TO A WEBSITE

CROSS REFERENCE TO RELATED APPLICATIONS

This application claims priority to U.S. provisional patent application Ser. No. 62/116,237, filed Feb. 13, 2015, which is incorporated herein in its entirety by this reference thereto.

TECHNICAL FIELD

The invention generally relates to improving experiences of online visitors to a website.

BACKGROUND

Websites displaying enterprise products and/or services routinely attract many visitors. The visitors to the websites are hereinafter referred to as online visitors.

The online visitors visit the websites to locate products/services of interest, to receive information about the products/services, to make payments, to lodge complaints, and the like.

An improved experience afforded to an online visitor on the website may enhance chances of the online visitor making a purchase on the website or the likelihood of the online visitor visiting the website again.

SUMMARY

In an embodiment of the invention, a computer-implemented method for improving an experience of an online visitor visiting a website is disclosed. The method detects a website access event indicating an access of the website by the online visitor. The method generates, by a processor, a visitor profile for the online visitor upon detecting the website access event. The visitor profile is generated by defining a plurality of attributes related, at least in part, to visitor activities on the website. A data field is allocated to each attribute from among the plurality of attributes to configure the visitor profile including a plurality of data fields. Each data field is capable of accommodating a respective fixed number of entries. The fixed number of entries for the each data field is determined based on a respective temporal threshold value computed to determine a number of entries required for storing of information related to one or more past activities of the online visitor on the website that are relevant to a current activity of the online visitor on the website. The method, dynamically updates the visitor profile, by the processor, based on the current activity of the online visitor on the website. The dynamic updating of the visitor profile includes inputting at least one entry in one or more data fields from among the plurality of data fields. Further, the method predicts, by the processor, at least one intention of the online visitor based on a state of the visitor profile selected at a chosen time instant during the current activity of the online visitor on the website.

In another embodiment of the invention, an apparatus for improving an experience of an online visitor visiting a website includes at least one processor and a memory. The memory stores machine executable instructions therein, that when executed by the at least one processor, causes the apparatus to detect a website access event indicating an access of the website by the online visitor. The apparatus generates a visitor profile for the online visitor upon detecting the website access event. The visitor profile is generated by defining a plurality of attributes related, at least in part, to visitor activities on the website. A data field is allocated to each attribute from among the plurality of attributes to configure the visitor profile including a plurality of data fields. Each data field is capable of accommodating a respective fixed number of entries. The fixed number of entries for the each data field is determined based on a respective temporal threshold value computed to determine a number of entries required for storing of information related to one or more past activities of the online visitor on the website that are relevant to a current activity of the online visitor on the website. The apparatus dynamically updates the visitor profile based on the current activity of the online visitor on the website. The dynamic updating of the visitor profile includes inputting at least one entry in one or more data fields from among the plurality of data fields. Further, the apparatus predicts at least one intention of the online visitor based on a state of the visitor profile selected at a chosen time instant during the current activity of the online visitor on the website.

In another embodiment of the invention, a non-transitory computer-readable medium storing a set of instructions that when executed cause a computer to perform a method for improving an experience of an online visitor visiting a website is disclosed. The method executed by the computer detects a website access event indicating an access of the website by the online visitor. The method generates a visitor profile for the online visitor upon detecting the website access event. The visitor profile is generated by defining a plurality of attributes related, at least in part, to visitor activities on the website. A data field is allocated to each attribute from among the plurality of attributes to configure the visitor profile including a plurality of data fields. Each data field is capable of accommodating a respective fixed number of entries. The fixed number of entries for the each data field is determined based on a respective temporal threshold value computed to determine a number of entries required for storing of information related to one or more past activities of the online visitor on the website that are relevant to a current activity of the online visitor on the website. The method dynamically updates the visitor profile based on the current activity of the online visitor on the website. The dynamic updating of the visitor profile includes inputting at least one entry in one or more data fields from among the plurality of data fields. Further, the method predicts at least one intention of the online visitor based on a state of the visitor profile selected at a chosen time instant during the current activity of the online visitor on the website.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
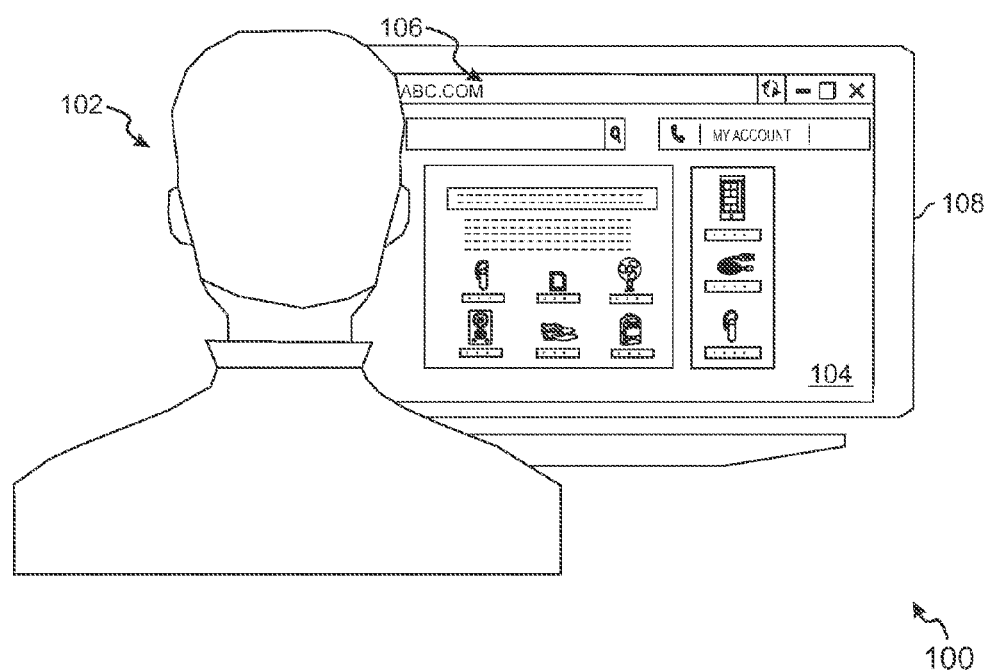
FIG. 1 shows an example representation of an online visitor visiting a website associated with an enterprise, in accordance with an example scenario.

FIG. 1 shows an example representation 100 of a user 102 browsing a website 104 associated with an enterprise, in accordance with an example scenario. The user 102 is hereinafter referred to as an online visitor 102. The online visitor 102 may utilize a web browser application 106 installed on a desktop computer 108 to access and browse the website 104. The enterprise associated with the website 104 may be a corporation, a financial institution, an educational institution, a small/medium sized company or even a brick and mortar entity. In the example representation, the website 104 is depicted as an e-commerce website displaying products and/or services offered for sale, for illustration purposes. It is understood that the website 104 may correspond to any one from among a news aggregator portal, a gaming or sports content related website, a social networking website, an educational content related portal and the like. Moreover, the website 104 may be hosted on a remote web server and the web browser application 106 may be configured to retrieve one or more web pages associated with the website 104 over a network. Examples of the network may include wired networks, wireless networks or a combination thereof. Examples of wired networks may include Ethernet, local area networks (LANs), fiber-optic cable networks and the like. Examples of wireless networks may include cellular networks like GSM/3G/4G/CDMA networks, wireless LANs, blue-tooth or Zigbee networks and the like. Examples of combination of wired and wireless networks may include the Internet. It is understood that the website 104 may attract a large number of online visitors, such as the online visitor 102. Moreover, the online visitors may use web browser applications installed on a variety of electronic devices, such as mobile phones, Smartphones, tablet computers, laptops, web enabled wearable devices such as smart watches and the like, to access the website 104 over the network.

The online visitors, such as the online visitor 102, visit the websites to locate products/services of interest, to receive information about the products/services, to make payments, to lodge complaints, and the like. An improved experience afforded to the online visitor 102 on the website 104 may enhance chances of the online visitor 102 making a purchase on the website 104 or the likelihood of the online visitor 102 to visit the website 104 again.

Most enterprises, typically, seek to predict intention of online visitors accessing their websites. Such predictions enable the enterprises to make suitable recommendations to the online visitors, which enhance online visitor experiences and/or improve chances of sale.

Conventional prediction mechanisms mostly use data captured from current and past website visits of the online visitors for predicting their intentions. For example, data captured from current and past visits of the online visitor 102 to the website 104 may include information such as device(s) used by the online visitor 102 to access the website 104, web pages visited by the online visitor 102 during each visit to the website 104, whether the online visitor 102 purchased a product or not, and the like. However, such prediction mechanisms do not take into account the fact that utilizing all information from past visits for intention prediction purposes may not be beneficial after a certain point in time. For example, it may be intuitively understood that if some event happened in the distant past, its influence on the online visitor's current web session would be lesser than any other event that has happened in the near past. The prediction mechanisms do not involve any such determination of how much information from past visits should be considered for visitor intention prediction purposes and as such the resultant intention prediction computation may include data which is no longer relevant for current intention prediction purposes. As a result, the predicted intention of an online visitor may be sub-optimal.

Further, the conventional prediction mechanisms typically use classifiers to predict intentions of online visitors to a website, such as the website 104. Most of the classifiers are static in nature, or more specifically, the classifiers are capable of receiving only fixed number of features. However, the data captured from current and past visits to the websites by the online visitor results in variable length inputs. For example, an online visitor's journey on a website may involve a visit to only two web pages, whereas another online visitor's journey on the website may involve a visit to five or more web pages and also include purchase of a product on the website. As such, a number of variables generated from journeys of online visitors may vary from one individual to another and, as such, the inputs require modification prior to their direct application to the classifiers. Moreover, the generation of non-fixed length inputs makes it difficult to use advanced classification algorithms for intention prediction purposes.

Various embodiments of the invention provide methods and apparatuses that are capable of overcoming these and other obstacles and providing additional benefits. More specifically, methods and apparatuses disclosed herein suggest techniques for determining information that is relevant to the current website visit of the online visitor from among all data corresponding to past website visits. The relevant information is then utilized for improving accuracy of a predicted intention of the online visitor, which is then utilized to effect an improvement in experiences of an online visitor visiting a website. Further, the methods and apparatuses disclosed herein provide techniques for extracting a comprehensive set of features/attributes from past and current activity of an online visitor on the website. The comprehensive set of features/attributes is cast in a fixed-length feature format enabling application of various advanced classification algorithms, such as algorithms based on artificial neural network or support vector machines (SVM) to improve accuracy of a visitor intention prediction, and, thereby improve online visitor experiences. An apparatus for improving online visitor experiences is explained with reference to FIG. 2.

Figure 2:
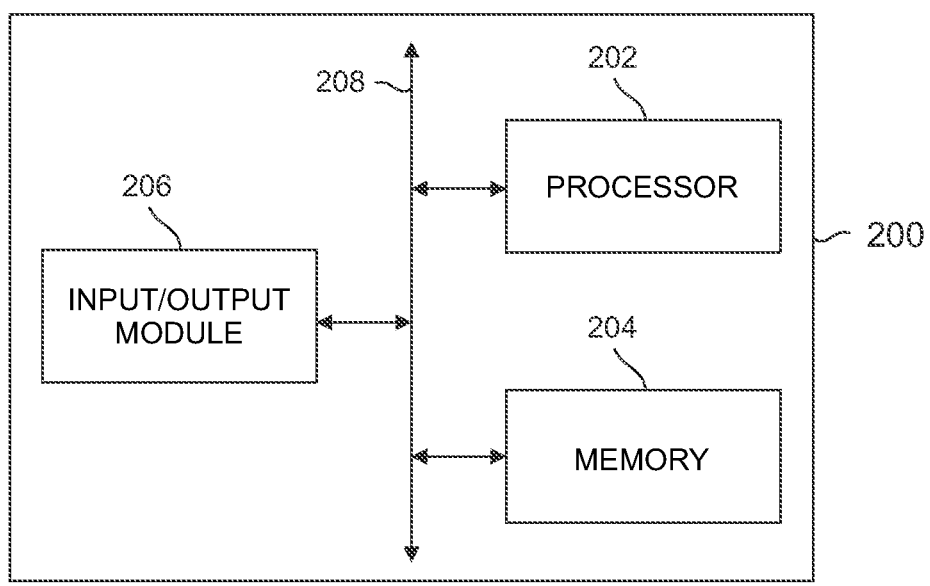
FIG. 2 is a block diagram showing an example apparatus configured to facilitate improvement in experiences of online visitors to a website, in accordance with an embodiment of the invention.

FIG. 2 is a block diagram showing an example apparatus 200 configured to facilitate improvement in experiences of online visitors to a website, in accordance with an embodiment of the invention. The term 'online visitors' as used herein refers to 'users' visiting the website. It is understood that the users may visit the website for a variety of purposes, such as for example, the users may visit the website to learn about products and/or services offered on the website, to purchase the products and/or services, to make payments, to lodge complaints, and the like. To that effect, the users may be existing customers or potential customers of the enterprise associated with the website.

In at least one embodiment, the term 'improving experiences of the online visitors' as used herein refers to enabling the users to achieve their respective objectives of visiting the website in an efficient and hassle-free manner. In an illustrative example, if an online visitor is seeking an answer to a query on the website, then such an intention of the online visitor may be predicted and a suitable answer may be provisioned, for example through a self-help widget or by using a web link to a frequently asked questions (FAQs), either proactively to the online visitor or upon receiving the query from the online visitor. In another illustrative example, if an online visitor is wishing to purchase a product on the website, then assistance may be offered to the online visitor in completing the purchase to improve the web experience of the online visitor.

The apparatus 200 includes at least one processor, such as a processor 202, and a memory 204. It is noted that although the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The apparatus 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to enable enterprise users to utilize the apparatus 200 for effecting improvement in experiences of online visitors. Furthermore, the I/O module 206 may be integrated with a monitoring mechanism configured to provide the enterprise users with real-time updates/alerts (for example, email notifications, SMS alerts, etc.) of changes to be made for efficiently addressing online visitor requirements.

In an embodiment, various components of the apparatus 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, a main board, a system board, or a logic board. The centralized circuit system 208 may also, or alternatively, include other printed circuit assemblies (PCAs) or communication channel media.

It is understood that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. Moreover, the apparatus 200 may be implemented as a centralized apparatus, or, alternatively, the various components of the apparatus 200 may be deployed in a distributed manner while being operatively coupled to each other. In another embodiment, the apparatus 200 may be embodied as a mix of existing open systems, proprietary systems and third party systems. In another embodiment, the apparatus 200 may be implemented completely as a set of software layers on top of existing hardware systems. In an exemplary scenario, the apparatus 200 may be any machine capable of executing a set of instructions (sequential and/or otherwise) so as to improve experiences of online visitors.

In at least one example embodiment, the I/O module 206 is communicably associated with one or more web servers hosting websites, such as the website 104 depicted in FIG. 1. The web servers may be configured to track website access by a plurality of visitors by way of tracking cookies (for example, web browser cookies) and/or tags, such as hypertext markup language (HTML) tags or JavaScript tags associated with the web pages of the website. In some cases, the web servers may also be capable of opening up a socket connection for an on-going visitor journey on the website to capture data related to visitor activity on the website. The web servers may be configured to provision the captured data to the I/O module 206 in an on-going manner in substantially real time or in some cases, the captured data may be provisioned as a data load to the I/O module 206 in an offline manner. The received data may include information such as web pages visited, time stamps associated with each web page visit, menu options accessed, drop-down selected or clicked, mouse movements, hypertext mark-up language (HTML) links those which are clicked and those which are not clicked, focus events (for example, events during which the online visitor has focused on a link/webpage for a more than a predetermined amount of time), non-focus events (for example, choices the online visitor did not make from information presented to him/her (for example, products not selected) or non-viewed content derived from scroll history of the online visitor), touch events (for example, events involving a touch gesture on a touch-sensitive device such as a tablet), non-touch events and the like. Additionally, the I/O module 206 is also configured to receive data related to which device was used (or is being used) by an online visitor for accessing the website, a web browser and/or operating system associated with the device used for accessing the website, a time of the day or a day of the week associated with the website visit, and the like.

In some embodiments, the I/O module 206 and/or the webs servers may be in operative communication with various customer touch points, such as electronic devices associated with the online visitors (such as the desktop computer 108 associated with the online visitor 102 in FIG. 1), other websites visited by the online visitors, customer support representatives (for example, voice-agents, chat-agents, IVR systems and the like) engaged by the online visitors on the websites and the like, to receive visitor interaction related data.

In an embodiment, the I/O module 206 is configured to store the received information corresponding to the each visitor in the memory 204. The received information corresponding to each online visitor may be used for improving experiences of respective online visitors. An improvement in an experience afforded to an online visitor on the website is explained hereinafter with reference to one online visitor. It is understood that experiences of several online visitors to the website may be improved in a similar manner.

In an embodiment, the processor 202 is configured to, with the content of the memory 204, cause the apparatus 200 to detect a website access event indicating an access of a website by an online visitor. To that effect, the apparatus 200 may be caused to configure the web pages of the website with tracking cookies and/or HTML/JavaScript tags, which may then enable the apparatus 200 to detect a website access event. In some embodiments, the web servers hosting the websites may capture activity of the visitor on the website using the tracking cookies and/or the HTML/JavaScript tags and provision such information in an on-going manner in substantially real-time (i.e. with a minimum delay) to the apparatus 200. In an illustrative example, a web server hosting the web pages of the website may open up a socket connection upon detecting the website access event to capture visitor activity on the website. The web server may then provision such captured information in substantially real-time to the apparatus 200.

In an embodiment, the processor 202 is configured to, with the content of the memory 204, cause the apparatus 200 to generate a visitor profile for the online visitor upon detecting the website access event. The term 'visitor profile' as used herein refers to a collection of data fields that are capable of receiving and storing information related to the online visitor's past and/or current activities on the website.

In an embodiment, the generation of the visitor profile may involve defining a plurality of attributes related, at least in part, to visitor activities on the website. For example, typical visitor activities on the website relate to initiating a browsing session on the website, conducting a purchase on the website, uploading a cart on the website, receiving a proactively offered chat invitation for chatting with a customer support representative on the website, accepting the chat invitation on the website and the like. Accordingly, the apparatus 200 is caused to define an attribute corresponding to each such visitor action/event, which the visitor may engage in during the online visitor's journey on the website. The attributes defined for such visitor actions/events, which may vary from one website visit to another, are referred to herein as dynamic attributes.

Furthermore, an online visitor's visit to the website involves use of an electronic device, a web browser, an operating system supporting the browser and the like. Such information may also be captured and utilized for prediction of the online visitor's intentions. In an embodiment, at least one attribute is defined to facilitate capture of information which is not related to visitor activities on the website, such as for example, device related information and/or personal information of the online visitor. The device related information may include information such as a type of device (for example, mobile device, desktop computer etc.), an operating system associated with the device (for example, Windows from Microsoft Corporation, Android from Google, iOS from Apple Corporation, and the like), a web browser application associated with the device (for example, Firefox from Mozilla Corporation, Chrome from Google, Internet Explorer from Microsoft Corporation and the like), etc. Some non-exhaustive examples of the personal information associated with the online visitor may include information such as a name of the online visitor, an occupation of the online visitor, age, marital status, contact information, email address, IP address associated with the online visitor and the like. An attribute defined to facilitate capture of such information, which is likely to remain substantially constant across several visits to the website by the online visitor, is referred to herein as an static attribute. Accordingly, the plurality of attributes defined by the apparatus 200 may include several dynamic attributes and one or more static attributes.

Furthermore, the generation of the visitor profile may include allocating a data field to each attribute. For example, a data field may be allocated for each dynamic or static attribute defined by the apparatus 200. The allocation of the data field to each data field may configure the visitor profile, so as to include a plurality of data fields. In an embodiment, each data field is capable of accommodating a respective fixed number of entries. The allocation of a data field capable of accommodating a fixed number of entries may be implemented by allocating a fixed number of physical/virtual memory storage locations/cells to each attribute, where the memory locations in the memory 204 are capable of storing entries related to the corresponding attribute.

As explained with reference to FIG. 1, if a visitor action or activity related event on a website happened in the distant past, its influence on the current visitor's journey on the website would be lesser than any other visitor action or event that has happened in the near past. Thus, a determination of how much information from any past visits of the online visitor to the website to be included in the visitor profile needs to be performed. In an embodiment, a number of entries that are to be accommodated in each data field may be computed based on determination of how much information from any past visits of the online visitor is to be included in the visitor profile.

In an embodiment, the apparatus 200 is configured to compute a temporal threshold value to determine a number of entries required for storing of information related to one or more past activities of the online visitor on the website that are relevant to a current activity of the online visitor on the website. The temporal threshold value is indicative of the number of past visits/web sessions of the online visitor, for which the corresponding activity related information is to be included in the visitor profile, and, accordingly the temporal threshold value is indicative of the number of entries to be included in respective data field. Thus, the fixed number of entries is determined by the temporal threshold value, beyond which any activity related information related to the past visits of the online visitor to the website are discarded. The computation of the temporal threshold value and the determination of the fixed number of entries for each data field is further explained with reference to an illustrative example below:

In an embodiment, the apparatus 200 may be caused to compute a mean value ($\mu$) and a standard deviation value ($\sigma$) from a statistical distribution of entries corresponding to the each attribute, where the statistical distribution of entries relates to one or more visits to the website by a plurality of online visitors. For example, if an attribute relates to 'purchase information' (i.e. this attribute captures information related to whether an online visitor purchased a product during a visit to the website or not), then for each visit to the website, information related to this attribute may be captured and recorded. Thereafter, a number of times an online visitor purchases a product during one or more visits to the website is plotted for each of the plurality of online visitors to configure the statistical distribution, and the mean value ($\mu$) and the standard deviation value ($\sigma$) may be computed from the statistical distribution. In at least one embodiment, the temporal threshold value is computed based on the mean value ($\mu$) and the standard deviation value ($\sigma$). For example, the temporal threshold value may be determined based on an equation: '$\mu + \alpha\sigma$', where value of '$\alpha$' is determined based on the observed statistical distribution. It is noted that the statistical distribution of different types of dynamic attributes may change over time and as a result, a value of '$\alpha$' may be evaluated from time to time. In an example scenario, the value of $\alpha$ may be chosen to be two. Accordingly, a number of entries for each data field may be determined based on an equation '$\mu + 2\sigma$' to compute the threshold value. For each attribute/data field, the value of $\mu$ and $\sigma$ may be separately computed from statistical distribution of entries associated therewith, and accordingly a fixed number of entries of each data field may be determined. For example, for an attribute, if value of $\mu$ and $\sigma$ are 5 and 0.5, respectively, then a number of fixed entries for the attribute is 6 (i.e. 5+(2×0.5)) and that the corresponding data field is configured to accommodate six entries, with each entry including information for corresponding attribute for one visit of the online visitor to the website (i.e. one web session). An example visitor profile including a plurality of data fields with each data field capable of accommodating a fixed number of entries is further explained with reference to FIG. 3.

Figure 3:
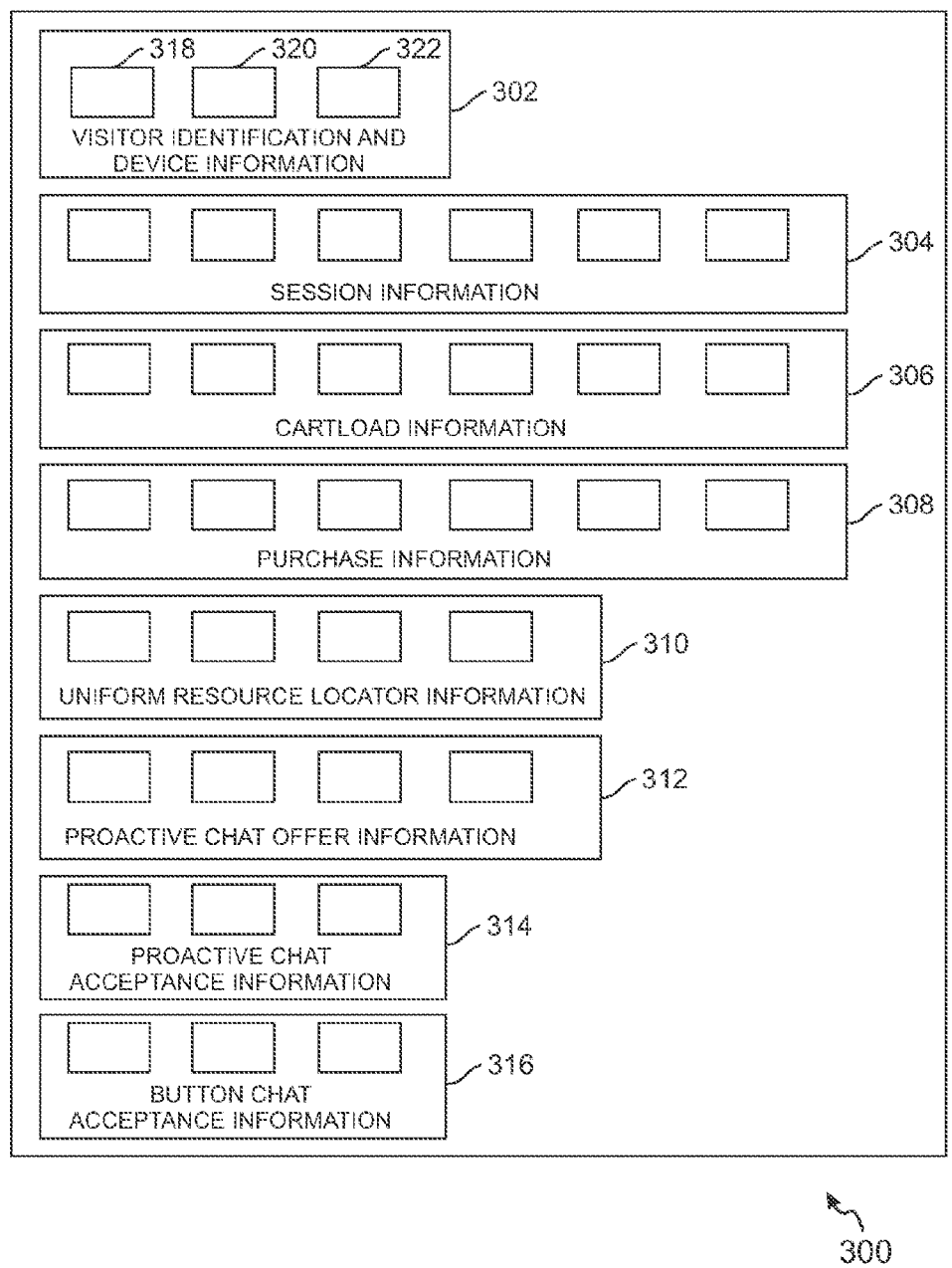
FIG. 3 shows an example representation of a visitor profile generated by the apparatus of FIG. 2, in accordance with an embodiment of the invention.

Referring now to FIG. 3, an example representation of a visitor profile 300 generated by the apparatus 200 of FIG. 2 is shown, in accordance with an embodiment of the invention. The visitor profile 300 is depicted to include data fields 302, 304, 306, 308, 310, 312, 314 and 316 corresponding to attributes 'Visitor Identification and Device Information', 'Session Information', 'Cartload Information', 'Purchase Information', 'Uniform resource locator (URL) Information', 'Proactive Chat Offer Information', 'Proactive Chat Acceptance Information' and 'Button chat acceptance Information', respectively. As explained with reference to FIG. 2, the apparatus 200 is caused to define a plurality of attributes and allocate a data field for each defined attribute to generate a visitor profile. Accordingly, the apparatus 200 may define a static attribute 'Visitor Identification and Device Information' and a plurality of dynamic attributes, such as 'Session Information', 'Cartload Information', 'Purchase information', 'URL Information', 'Proactive Chat Offer Information', 'Proactive Chat Acceptance Information' and 'Button chat acceptance Information'. Furthermore, each defined attribute may be allocated a data field configured to accommodate a fixed number of entries. The fixed number of entries for each data field may be determined based on computing a temporal threshold value as explained with reference to FIG. 2. Accordingly, the data field 302 corresponding to the attribute 'Visitor Identification and Device Information' is depicted as capable of accommodating three entries (exemplarily depicted by blocks 318, 320 and 322). The data fields 304, 306, 308, 310, 312, 314 and 316 are depicted to accommodate six, six, six, four, four, three and three entries, respectively. It is understood, that each entry may be allocated physical/virtual memory allocation for storing information related to the corresponding attribute.

In an example embodiment, each entry in a data field may be configured to store relevant information related to the corresponding attribute for one visit to the website by the online visitor. For example, for the attribute 'Session Information', relevant information captured for an online visitor's journey on a website may include a session start time, a session end time, last browsed uniform resource locators (URLs), a number of pages visited in current session, session duration, external/internal search terms, a search type (i.e. whether the search was organic or paid), a first page URL, a last page URL, a maximum depth reached in the current session, a relative depth between the first page URL and the last page URL and the like. Such relevant information captured for each of six visits of the online visitor to the website may be accommodated in the data field 304.

In another illustrative example, for the attribute 'Purchase Information', relevant information captured for an online visitor's journey on a website may include information such as, but not limited to, whether one or more products were purchased in the current session or not, whether the online visitor purchased (a particular item) or not, product names, time spent before purchase, if purchased then what is the amount spent and the like. Similarly, for the attribute 'Cartload Information', relevant information captured for an online visitor's journey on a website may include information such as but not limited to, whether the online visitor populated cart in the current session or not, whether the online visitor abandoned cart in the current session or not and the like. The relevant information captured corresponding to the attribute 'URL Information' may include information such as URLs and tokens of web pages visited by the online visitor, a sequence of URLs visited, time stamp associated with each URL indicative of the time spent on each web page, etc. The relevant information captured corresponding to the attribute 'Proactive Chat Offer Information' may include information such as, but not limited to, whether a proactive chat was offered, time since start of a session when chat was offered, a page type where chat was offered and the like. The relevant information captured corresponding to the attribute 'Proactive Chat Acceptance Information' may include information, such as but not limited to, what web page was the chat accepted, time from the session start, how many web pages has the online visitor visited so far and the like. The relevant information captured corresponding to the attribute 'Button Chat Acceptance Information' may include information about past button chat accepts, whether chat was transferred or not and the like. It is understood that the above types of dynamic attributes are suggested herein for illustrative purposes, and many such types of attributes may be defined and data fields allocated to each attribute to configure the visitor profile.

Referring now to FIG. 3, in an embodiment, one or more data fields in the generated visitor profile include entries for a corresponding attribute based on the one or more past activities of the online visitor on the website. More specifically, the visitor profile, such as the visitor profile 300, which is generated for the online visitor upon detection of the website access event include data fields with at least some entries filled with information from past activities of the online visitor, if the online visitor has previously visited the website. However, it is understood that if the online visitor is visiting the website for the first time, then the data field may not include any entries in the generated visitor profile. As such, the data fields capable of accommodating respective fixed number of entries may be allocated to defined attributes that are captured corresponding to the current visit to the website for the online visitor and the data fields may be empty initially for a first time visitor to the website.

Referring now to FIG. 2, in an embodiment, the processor 202 is configured to, with the content of the memory 204, cause the apparatus 200 to dynamically update the visitor profile based on the current activity of the online visitor on the website. More specifically, based on the current activity of the online visitor on the website, the apparatus 200 may be caused to input entries in one or more data fields of the visitor profile. The term 'current activity' of the online visitor as used herein refers to visitor actions on the website, which may involve performing one or more actions, such as but not limited to, opening or closing a web page, viewing content pieces related to products, adding a product to a shopping cart, purchasing a product, accepting an offer for a chat invitation with a customer support representative, engaging in a chat interaction with the customer support representative and the like. Every visitor activity on the website, such as a page visit, an addition to a cart, a purchase, a chat offered or accepted and the like, may trigger an event result in inputting entries in the data fields associated with the visitor profile.

In an embodiment, inputting an entry in a data field based on the current activity of the online visitor may include dislodging an earliest entry in the data field if the data field is full with the respective fixed number of entries prior to the inputting of the entry in the data field. More specifically, if a current status of a data field is such that a number of entries included therein are equal to the respective number of fixed entries, then any additional entry to the data field may dislodge the earliest (or oldest) entrant into the data field so as to maintain the fixed number of entries in the respective data field. However, if the current status of the data field is such that less than the fixed number of entries is populated, then the additional entries may be included in the data field till a number of entries included therein are equal to the respective number of fixed entries. Thereafter, new entries may dislodge earliest (or oldest) entrants in the data field. The updating of elements of data field based on visitor activity on the website is further explained with reference to FIG. 4.

Figure 4:
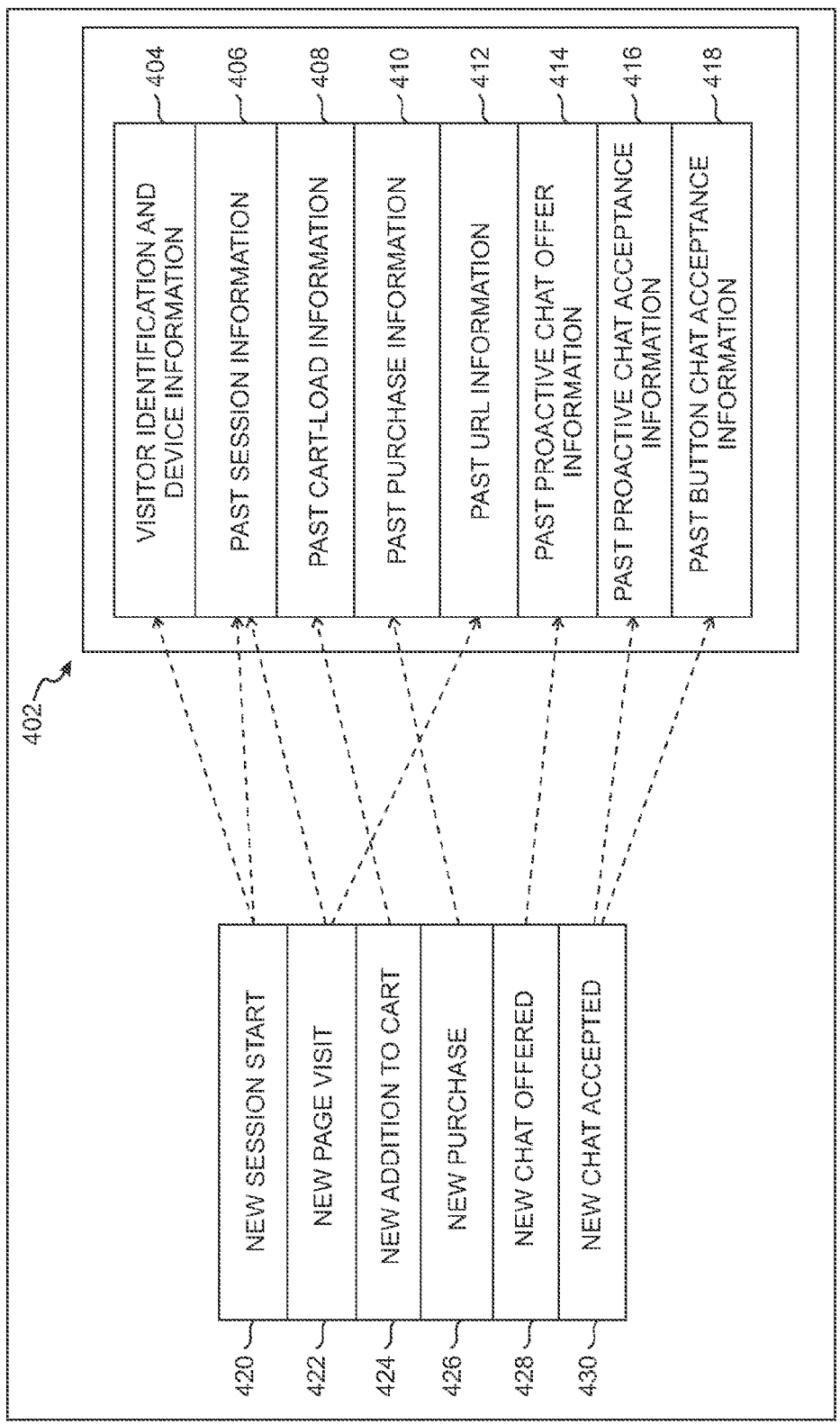
FIG. 4 shows an example representation for illustrating a visitor profile being updated in real-time based on an on-going visitor activity on a website, in accordance with an embodiment of the invention.

Referring now to FIG. 4, an example representation 400 is shown for illustrating a visitor profile 402 being updated in real-time based on an on-going visitor activity on a website, in accordance with an embodiment of the invention. As explained with reference to FIG. 2, a visitor profile is generated for an online visitor upon detection of a website access event. Moreover, the generated visitor profile includes a plurality of data fields corresponding to defined attributes. Further, one or more data fields may include entries for corresponding attributes if the online visitor has previously visited the website. In the example representation 400 depicted in FIG. 4, the visitor profile 402 corresponds to an online visitor who has visited the website in the past. Accordingly the generated visitor profile 402 include entries from past visitor activities on the website in each data field.

The visitor profile 402 is depicted to include data fields 404, 406, 408, 410, 412, 414, 416 and 418 including visitor identification and device information, past session information, past cart-load information, past purchase information, past URL information, past proactive chat offer information, past proactive chat acceptance information and past button chat acceptance information, respectively.

As explained with reference to FIG. 2, with each visitor activity on the website during the current journey on the website, one or more events are triggered, resulting in one or more entries in data fields of the visitor profile 402 being updated.

In the example representation 400, visitor activity on the website is depicted to have triggered events 420, 422, 424, 426, 428 and 430 corresponding to 'new session start', 'new page visit', 'new addition to cart', 'new purchase', 'new chat offered' and 'new chat accepted' activities of the online visitor on the website. Each event may result in updating entries related to attributes stored in one or more data fields. For example, upon triggering of the event 420 related to 'new session start' activity of the online visitor, an entry in the data fields 404 and 406 related to 'visitor identification and device information' and 'past session information', respectively, may be updated. Further, upon triggering of the event 422 related to 'new page visit' activity of the online visitor, one or more elements in the data fields 406 and 412 related to data fields 'past session information' and the 'past URL information', respectively, may be updated. Similarly, the triggering of the events 424, 426 and 428 may result in updating entries in the data fields 408, 410 and 414, respectively, whereas triggering of the event 430 may result in updating entries in the data fields 416 and 418. Accordingly, the information included in the visitor profile 402 may be updated in real-time with on-going activity on the website by the online visitor. At any chosen time instant, a state of a visitor profile, such as the visitor profile 402 may be captured using a sliding window based technique as will be further explained with reference to FIG. 5.

Figure 5:
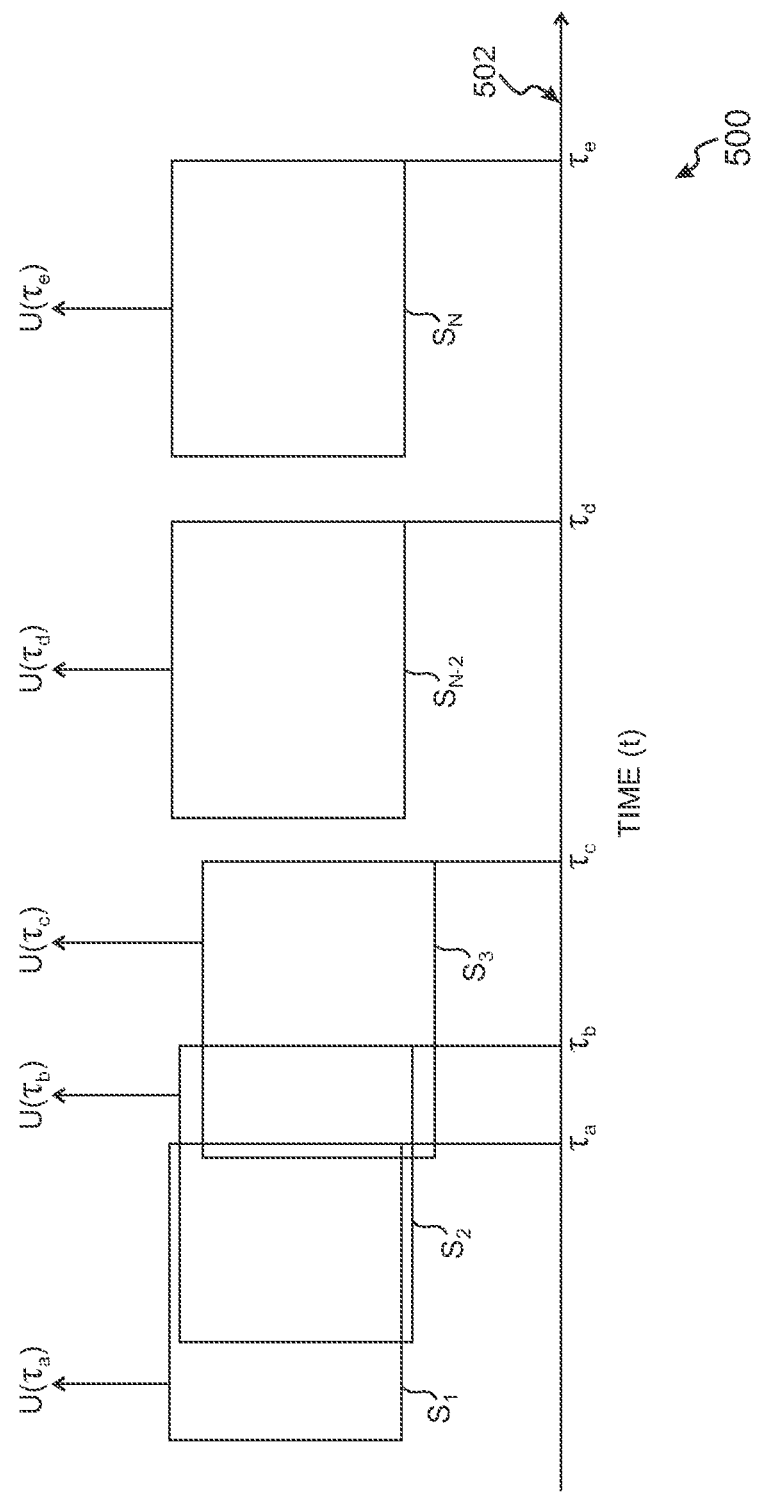
FIG. 5 shows an example representation for illustrating a sliding window based selection of a state of a visitor profile at a chosen time instant, in accordance with an embodiment of the invention.

Referring now to FIG. 5, an example representation 500 is shown for illustrating a sliding window based selection of a state of visitor profile at a chosen time instant, in accordance with an embodiment of the invention. As explained with reference to FIG. 2, the fixed number of entries in each data field determines how much information from past visitor activities on the website need to be included for each type of attribute in the visitor profile. At a chosen time instant, i.e. at any time instant during an on-going journey of the online visitor on the website, information corresponding to the entries included in the data fields of the visitor profile configure a 'state' of the visitor profile.

The example representation 500 depicts a time-line 502 for illustrating variation in the state of the visitor profile with time 't'. Moreover, a sliding window capable of assuming multiple positions along the time line 502 is also depicted in the example representation 500. A width of the sliding window may be construed as the equivalent of taking into account the fixed number of entries of multiple data fields, which determine the amount of information to be included in the visitor profile.

A state of the visitor profile determined at time '$\tau_a$' is represented by $U(\tau_a)$. An amount of information included within the visitor profile $U(\tau_a)$ is estimated based on the information included within the boundaries of sliding window positioned at time '$\tau_a$' (the corresponding portion of the sliding window marked as '$S_1$' in the example representation 500). With each visitor activity on the website, a number of elements in one or more data fields corresponding to the various attributes may be populated with new information. If those data fields were previously full (i.e. the data fields included their respective fixed number of entries), then some of the oldest elements in those data fields may be discarded as explained with reference to FIG. 2. Accordingly, with increasing passage of time spent on the website by the online visitor, new information corresponding to the visitor activity may be captured and various entries in the data fields may be dynamically updated. At the same time, one or more older entries in the data fields, which are no longer relevant to the current web session may be discarded, thus in effect, resulting in sliding of the sliding window to reflect the change in the state of the visitor profile. Accordingly, the state of visitor profile changes over time as depicted by visitor profiles $U(\tau_b)$, $U(\tau_c)$, $U(\tau_d)$ and $U(\tau_e)$ determined at time instants '$\tau_b$', '$\tau_c$', '$\tau_d$' and '$\tau_e$'. The amount of information included in the visitor profiles $U(\tau_b)$, $U(\tau_c)$, $U(\tau_d)$ and $U(\tau_e)$ being reflected by the boundaries of the sliding window positioned at time instants '$\tau_b$', '$\tau_c$', '$\tau_d$' and '$\tau_e$' respectively (the corresponding portions marked as '$S_2$', '$S_3$', '$S_{N-2}$' and '$S_N$' n the example representation 500, respectively).

As explained above, the visitor profile is updated in real-time with on-going visitor activity on the website, and, at any given instant of time, a state of the visitor profile may be selected using the sliding window based technique explained above.

Referring now to FIG. 2, in an embodiment, the processor 202 is configured to, with the content of the memory 204, cause the apparatus 200 to predict at least one intention of the online visitor based on the state of the visitor profile selected at a chosen time instant during the current activity of the online visitor on the website. To that effect, the apparatus 200 is caused to transform entries in the plurality of data fields associated with the captured state of visitor profile to generate a plurality of feature vectors. More specifically, the entries in the plurality of data fields may be subjected to transformation or conversion into a more meaningful or useful form by the apparatus 200. The transformation of the entries in the visitor profile may include normalization of content included therein. In at least one example embodiment, the normalization of the content is performed to standardize spelling, dates and email addresses, disambiguate punctuation, etc. In an example embodiment, the apparatus 200 is also caused to normalize word classes, URLs, symbols, days of week, digits, and so on. Some non-exhaustive examples of the operations performed by the apparatus 200 for normalization of content include converting all characters in the text data in the entries to lowercase letters, stemming, stop-word removal, spell checking, regular expression replacement, removing all characters and symbols that are not letters in the English alphabet, substituting symbols, abbreviations, and word classes with English words, and replacing two or more space characters, tab delimiters, and newline characters with a single space character etc.

In an embodiment, the apparatus 200 is further caused to extract features from the text data to look for occurrences of contiguous sequences of words in n-gram based features. The n-gram based features may include three unigrams in which words a, b, and c occur, two bi-grams in which two pairs of words occur, one tri-gram in which three specific single words occur, and the like. Types of features can include co-occurrence features where words are not contiguous but co-occur in, for example, a phrase. In some embodiments, the apparatus 200 may also be configured to perform weighting of features.

In an embodiment, the transformation of the information may also involve clustering of content included therein. At least one clustering algorithm from among K-means algorithm, a self-organizing map (SOM) based algorithm, a self-organizing feature map (SOFM) based algorithm, a density-based spatial clustering algorithm, an optics clustering based algorithm, and the like, may be utilized for clustering of information included in the visitor profile. The transformation of the entries in the visitor profile is performed to generate feature vectors, which may then be provided to at least one classifier associated with intention prediction to facilitate prediction of the at least one intention of the online visitor. In at least one example embodiment, the memory 204 is configured to store one or more text mining and intention prediction models as classifiers. The processor 202 of the apparatus 200 may be caused to provision the feature vectors generated upon transformation of entries in the data fields to the classifiers to facilitate prediction of at least one intention of the online visitor.

The feature vectors provisioned to the classifiers may include, but are not limited to, any combinations of word features such as n-grams, unigrams, bigrams and trigrams, word phrases, part-of-speech of words, sentiment of words, sentiment of sentences, position of words, visitor keyword searches, visitor click data, visitor web journeys, cross-channel journeys, call-flow, the visitor interaction history, and the like. In an embodiment, the classifiers may utilize any combination of the above-mentioned input features to predict the online visitor's likely intents. In an embodiment, an intention predicted for the online visitor corresponds to an outcome (such as for example a 'YES' or a 'No' outcome or even a 'High' or a 'Tow' outcome) related to one of a propensity of the online visitor to engage in a chat interaction, a propensity of the online visitor to make a purchase on the website and a propensity of the online visitor to purchase a specific product displayed on the website.

It is noted that the transformation of the entries in the visitor profile may facilitate in generation of feature vectors, which are of fixed length. The fixed length feature vectors may not only be utilized directly in conventional classifiers, such as Naïve Bayes with Markov chain and logistic regression, but also in advanced classifiers such as those using artificial neural network or support vector machines (SVM), thereby improving the accuracy of a prediction of online visitor's intention and enabling a provisioning of a better online experience. It is understood that the classifiers used for visitor intention prediction purposes may not be limited to those mentioned above. Indeed other classifiers, such as those based on Rule Engines, Decision Trees, k-nearest neighbor, K-means, and the like, may also be used for online visitor intention prediction purposes.

In an embodiment, the apparatus 200 is caused to select states of the visitor profile at multiple instances in time during the on-going journey of the online visitor on the website, and, further the apparatus 200 may be caused to predict intention of the online visitor corresponding to each selected state of the visitor profile associated with the online visitor's journey on the website. The prediction of the intention of the online visitor at multiple instances in time during the on-going journey of the online visitor on the website is explained with an illustrative example in FIG. 6.

Figure 6:
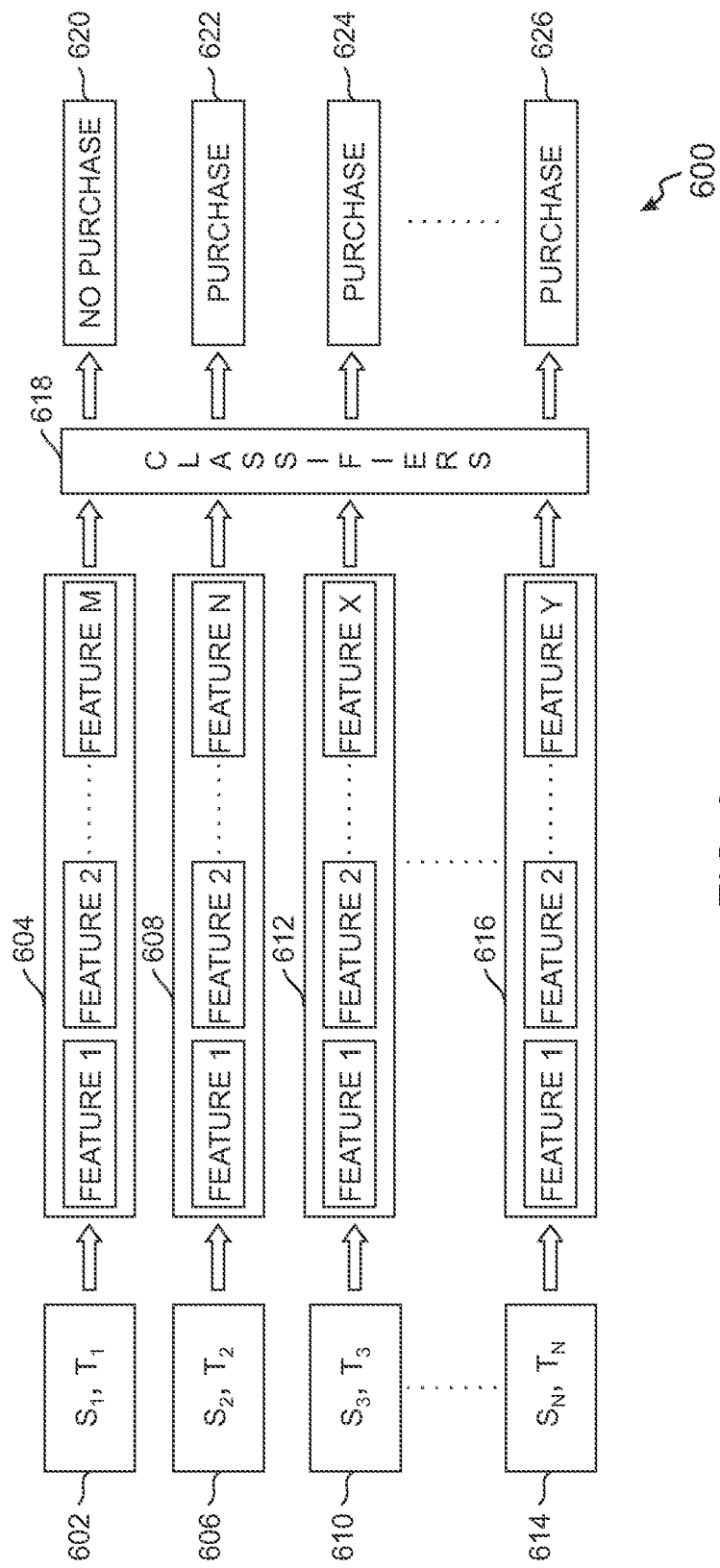
FIG. 6 shows an example representation for illustrating prediction of an online visitor's intention at multiple instances in time during the on-going journey of the online visitor on the website, in accordance with an embodiment of the invention.

FIG. 6 shows an example representation 600 for illustrating prediction of online visitor's intention at multiple instances in time during an on-going journey of the online visitor on the website, in accordance with an embodiment of the invention. As explained with reference to FIG. 5, a state of the visitor profile may be selected at a chosen time instant and the entries in the visitor profile corresponding to the captured state may be transformed and feature vectors may be generated from the entries. More specifically, for each state of the visitor profile selected at a chosen time instant, a set of feature vectors may be generated. In the example representation 600, for state $S_1$ selected at time instant $T_1$, feature vectors such as feature vectors 1 to M are generated as exemplarily depicted by blocks 602 and 604. For a state of the visitor profile '$S_2$' captured at time instant $T_2$, where $T_2>T_1$, feature vectors, such as feature vectors 1 to N are generated as exemplarily depicted by blocks 606 and 608. For a state of the visitor profile '$S_3$' captured at time instant $T_3$, where $T_3>T_2$, feature vectors, such as feature vectors 1 to X are generated as exemplarily depicted by blocks 610 and 612 and so on and so forth until a state of the visitor profile '$S_N$' captured at time instant $T_N$, where $T_N>>T_3$, feature vectors, such as feature vectors 1 to Y are generated as exemplarily depicted by blocks 614 and 616. The features vectors that are generated corresponding to each time instant may be provisioned to one or more classifiers exemplarily (depicted by block 618 in the example representation 600).

As explained above, the classifiers may be configured to process the feature vectors using structured and un-structured text mining and prediction models to provide a prediction of the online visitor's intention. In an example embodiment, the classifiers are configured to determine whether the online visitor will purchase a product during the on-going online visitor's journey on the website. In an example scenario, the classifiers may predict the visitor's intention to be 'No purchase' (i.e. the online visitor will not make a purchase given the current state of the visitor profile) at state $S_1$ as exemplarily depicted at block 620. Further, the classifiers may predict the visitor's intention to be 'Purchase' for each of the subsequent states as exemplarily depicted by blocks 622, 624 and 626, respectively.

Referring now to FIG. 2, in an embodiment, the processor 202 is configured to, with the content of the memory 204, cause the apparatus 200 to determine one or more recommendations based on the predicted intention (for example, purchase or no purchase, and the like) of the online visitor. In an embodiment, the recommendations determined by the apparatus 200 may include, but are not limited to, offering suggestions to the customer support representative for addressing concerns of the online visitor during the chat interaction, routing the chat interaction to a customer support representative suited to address the concerns of the online visitor, displaying content relevant to the current activity of the online visitor on the website, displaying at least one of a pop-up and a widget with content suited to assist the online visitor in making a purchase or addressing a query on the website. The apparatus 200 may further be caused to effect an improvement in the online visitor's experience of visiting the website based on the determined recommendations. An example improvement effected in online visitor's experience based on a determined recommendation is explained with reference to FIG. 7.

Figure 7:
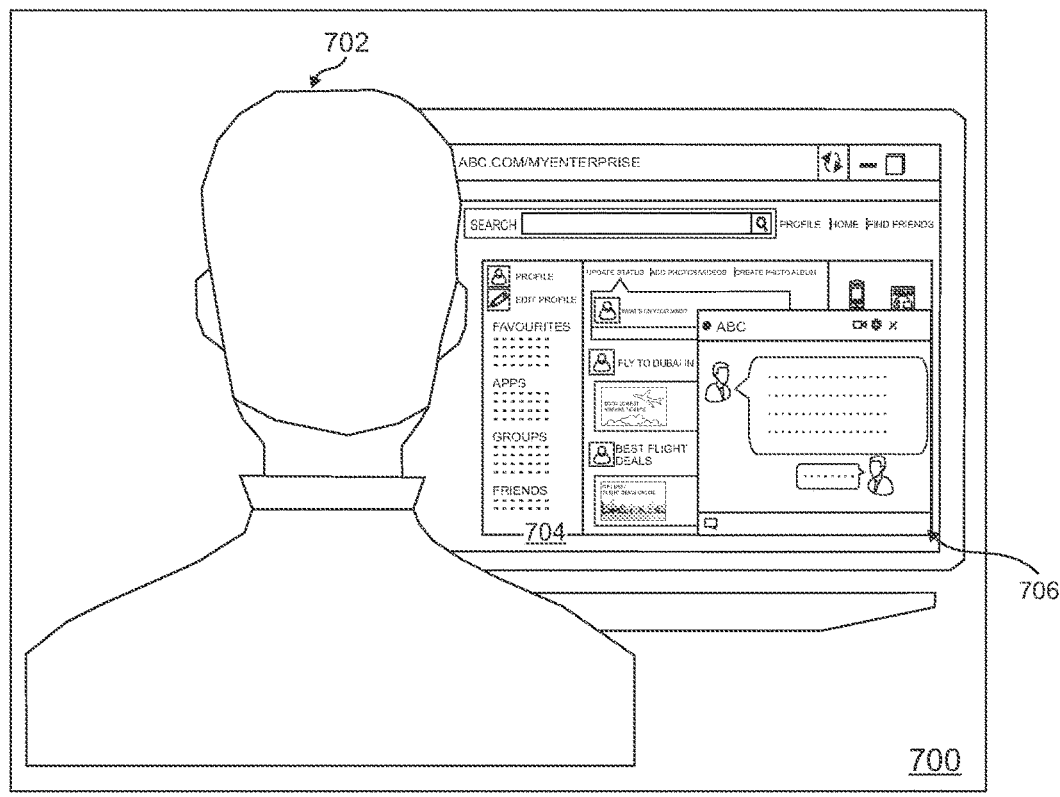
FIG. 7 shows an example representation for illustrating a chat interaction of an online visitor with a customer support representative during an on-going journey on a website, in accordance with an embodiment of the invention.

Referring now to FIG. 7, an example representation 700 is shown for illustrating a chat interaction of an online visitor 702 with a customer support representative during an on-going journey on a website 704, in accordance with an embodiment of the invention. As explained with reference to FIG. 2, the apparatus 200 may be caused to predict at least one intention of the online visitor and determine recommendations for improving an experience of visiting the website for the online visitor. In an example scenario, an intention predicted corresponding to the online visitor 702 may suggest that the online visitor 702 requires assistance in completing a purchase on the website 704. In an example scenario, the apparatus 200 may cause the website 704 to display a pop-up including a message, such as 'Would you like our customer support representative to assist you with your purchase?' Upon receiving an acceptance for chat related assistance, the online visitor 702 may be connected to a remote customer support representative (referred to hereinafter as agent) using a chat application as exemplarily depicted by a chat window 706 displayed on the website. The agent may then assist the online visitor 702 in completing the purchase.

As explained with reference to FIG. 6, the apparatus 200 may be caused to predict, at regular intervals (for example, five second intervals) how likely an online visitor (such as the online 702) is to interact. The apparatus 200 may further be caused to determine if a request for interaction is to be proactively offered to the online visitor 702 on the website 704 upon determining that the online visitor 702 requires interaction assistance. For example, the processor 202 may be configured to predict a benefit of offering chat assistance to the online visitor 702 (whether the assistance may result in sale or enhance a customer experience) as opposed to not offering chat assistance to the online visitor 702. The processor 202 may also check a current staffing of the resources to determine how many resources may be able to chat with the said online visitor 702. Given the availability of resources, the processor 202 may determine a score based on predictions related to how likely the online visitor 702 is to seek assistance and the benefit of offering assistance to a customer likely to interact. Only when the score is greater than a pre-determined threshold value (for example a numerical value chosen empirically, such as 0.5 for instance), the chat assistance may be proactively offered to the online visitor 702. In some embodiments, a customer lifetime value (CLU) of the online visitor 702 may also be accounted for, during determination of offering of interaction assistance to the online visitor 702.

It is understood that chat based assistance for completing the purchase is only suggested herein for illustration purposes. It is noted that the agent may also provide recommendations for purchasing similar or related products/services to the online visitor 702 or provide information related to promotional offers or discount schemes that the online visitor 702 may find useful or even answer queries or resolve concerns related to a variety of visitor concerns, such as those related to billing, shipping, product replacements and the like. Moreover, in some example scenarios, voice based assistance using human agents or machine based resources (for example, interactive voice response system), self-help widgets and the like may also be offered to online visitors, such as the online visitor 702, for providing a seamless and enjoyable website experience to the online visitors. A method for improving an experience of an online visitor is explained with reference to FIG. 8.

Figure 8:
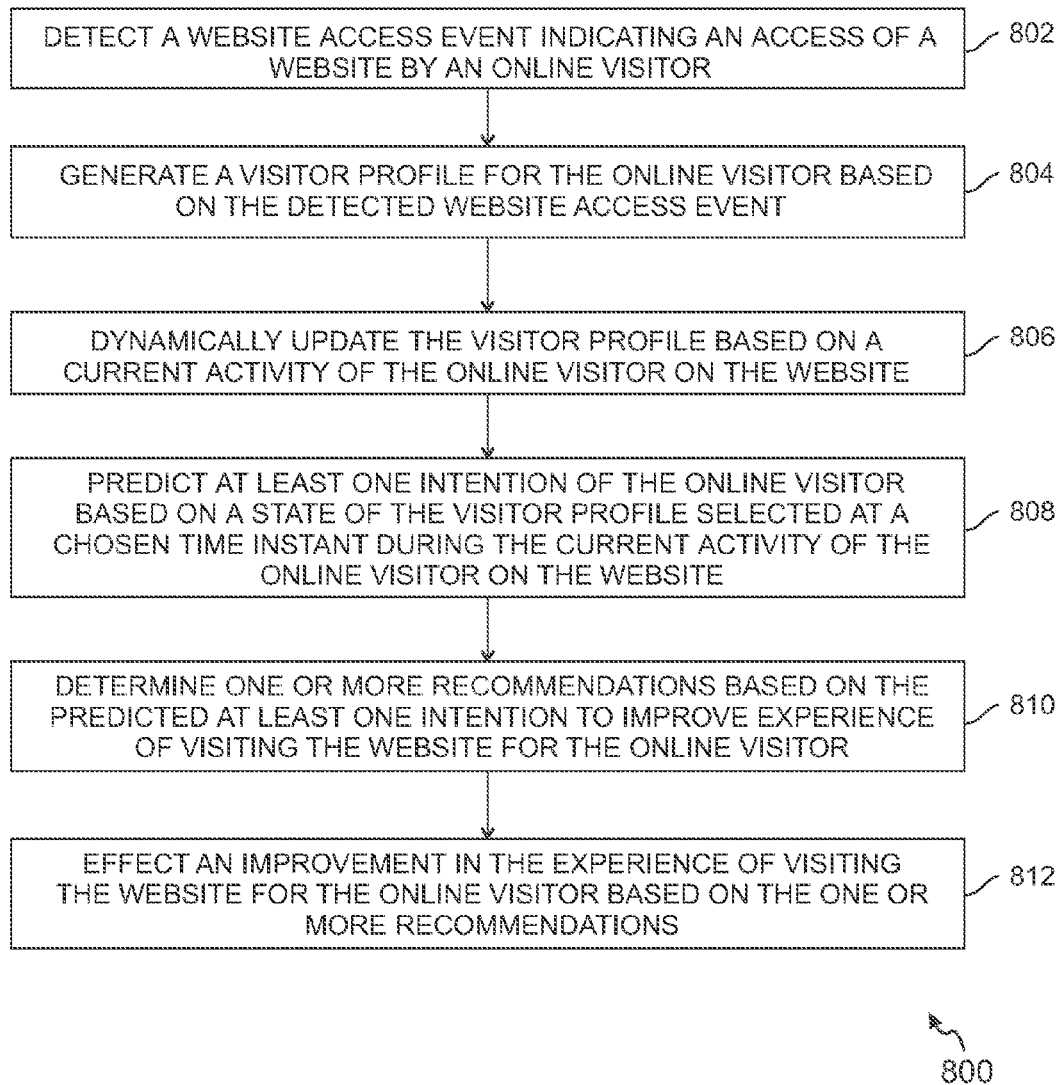
FIG. 8 is a flow diagram of an example method for improving an experience of an online visitor, in accordance with an embodiment of the invention.

FIG. 8 is a flow diagram of an example method 800 for improving an experience of an online visitor, in accordance with an embodiment of the invention. The method 800 depicted in the flow diagram may be executed by, for example, the apparatus 200 explained with reference to FIGS. 2 to 7. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with help of the apparatus 200. For example, one or more operations corresponding to the method 800 may be executed by a processor, such as the processor 202 of the apparatus 200. It is noted that although the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 800 can be described and/or practiced by using an apparatus other than the apparatus 200. The method 800 starts at operation 802.

At operation 802 of the method 800, a website access event indicating an access of a website by an online visitor is detected. As explained with reference to FIG. 2, the web pages of the website may be associated with cookies or tagged with HTML or JavaScript tags. One or more web servers associated with the website may track all visitor activity on the website, for example by using browser cookies or HTML or JavaScript tags on web pages. The web servers may accordingly facilitate the detection of the website access event by the online visitor.

At operation 804 of the method 800, a visitor profile for the online visitor is generated upon detecting the website access event. As explained with reference to FIGS. 2 and 3, the generation of the visitor profile involves defining a plurality of attributes related, at least in part, to visitor activities on the website and allocating a data field to each attribute to configure the visitor profile comprising a plurality of data fields. Further, as explained with reference to FIGS. 2 and 3, each data field is capable of accommodating a respective fixed number of entries. The fixed number of entries for the each data field is determined based on a respective temporal threshold value as explained with reference to FIG. 3.

At operation 806 of the method 800, the visitor profile is dynamically updated based on a current activity of the online visitor on the website. In an embodiment, dynamically updating the visitor profile includes inputting at least one entry in one or more data fields from among the plurality of data fields. Further, inputting an entry in a data field based on the current activity of the online visitor may include dislodging an earliest entry in the data field if the data field is full with the respective fixed number of entries prior to the inputting of the entry in the data field.

At operation 808 of the method 800, at least one intention of the online visitor is predicted based on a state of the visitor profile selected at a chosen time instant during the current activity of the online visitor on the website. The state of the visitor profile may be selected using a sliding window technique as explained with reference to FIG. 5 and is not explained herein. As explained with reference to FIG. 2, the entries in the plurality of data fields may be subjected to transformation, which may include normalization of content included therein. The transformation of the entries in the visitor profile is performed to generate feature vectors, which may then be provided to at least one classifier associated with intention prediction to facilitate prediction of the at least one intention of the online visitor. The feature vectors provisioned to the classifiers may include, but are not limited to, any combinations of words features such as n-grams, unigrams, bigrams and trigrams, word phrases, part-of-speech of words, sentiment of words, sentiment of sentences, position of words, visitor keyword searches, visitor click data, visitor web journeys, cross-channel journeys, call-flow, the visitor interaction history and the like. In an embodiment, the classifiers may utilize any combination of the above-mentioned input features to predict the online visitor's likely intentions. In an embodiment, an intention predicted for the online visitor corresponds to an outcome (such as a 'YES' or a 'NO' outcome, or a 'HIGH' or a 'LOW' outcome) related to one of a propensity of the online visitor to engage in a chat interaction, a propensity of the online visitor to make a purchase on the website and a propensity of the online visitor to purchase a specific product displayed on the website.

At operation 810 of the method 800, one or more recommendations to improve experience of visiting the website for the online visitor are determined based on the predicted at least one intention. The method 800 ends at operation 812. At operation 812 of the method 800, an improvement in the experience of visiting the website for the online visitor is effected based on the one or more recommendations. The determination of the one or more recommendations and a subsequent effecting of an improvement in the online visitor's experience of visiting the website may be performed as explained with reference to FIGS. 6 and 7 and is not explained herein.

Without in any way limiting the scope, interpretation, or application of the claims appearing below, advantages of one or more of the exemplary embodiments disclosed herein suggest a framework for improving prediction of online visitors' intentions using past interactions of the online visitors. More specifically, a right amount of information from past interactions or past events associated with a visitor is determined, so that the visitor's online experience may be improved based on most recent interactions and not by considering information which is not from recent past or which may have less influence on current session associated with the online visitor. Further, techniques disclosed herein also enable efficient storage and retrieval of past interaction data associated with the online visitors. Moreover, the casting of comprehensive set of features/attributes from past interactions in a fixed-length feature format enables application of various advanced classification/regression algorithms such as algorithms based on artificial neural network or support vector machines (SVM), thereby improving an accuracy of prediction of online visitor's intention and enabling a provisioning of better customer service experience.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   detecting a website access event indicating an access of a website by an online visitor;
   generating, by a processor, a visitor profile for the online visitor upon detecting the website access event, the visitor profile generated by:
      defining a plurality of attributes related, at least in part, to visitor activities on the website, wherein at least one attribute is defined to facilitate capture of information which is not related to visitor activities on the website; and
      allocating a data field to each attribute from among the plurality of attributes to configure the visitor profile comprising a plurality of data fields, each data field capable of accommodating a respective fixed number of entries, the fixed number of entries for the each data field determined based on a respective temporal threshold value computed to determine a number of entries required for storing of information related to one or more past activities of the online visitor on the website that are relevant to a current activity of the online visitor on the website; and
      computing, by the processor, a mean value and a standard deviation value from a statistical distribution of entries corresponding to the each attribute, the statistical distribution of entries related to one or more visits to the website by a plurality of online visitors, wherein the temporal threshold value is computed based on the mean value and the standard deviation value;
   dynamically updating the visitor profile, by the processor, based on the current activity of the online visitor on the website, wherein dynamically updating the visitor profile comprises inputting at least one entry in one or more data fields from among the plurality of data fields;
   determining a state of the visitor profile at a chosen time instant by transforming, by the processor, entries in the plurality of data fields associated with the state of visitor profile to generate a plurality of feature vectors;
   provisioning, by the processor, the plurality of feature vectors to at least one classifier associated with intention prediction to facilitate prediction of the at least one intention of the online visitor;
   predicting, by the processor, at least one intention of the online visitor based on the state of the visitor profile selected at the chosen time instant during the current activity of the online visitor on the website;

determining a score based on said predicted intention; and when the score based on the predicted intention is greater than a pre-determined threshold value modifying, by the processor, the online visitor's experience while the online visitor is visiting the website by determining one or more recommendations based on the predicted intention of the visitor, wherein said recommendations determined comprise offering suggestions to a customer support representative to address concerns of the visitor during a chat interaction, routing the chat interaction to a customer support representative suited to address the concerns of the visitor, displaying content relevant to a current activity of the visitor on a website, displaying at least one of a pop-up and a widget with content suited to assist the visitor in making a purchase, and addressing a query on the website.

2. The method of claim 1, wherein at least one data field from among the plurality of data fields of the generated visitor profile comprises one or more entries for a corresponding attribute based on the one or more past activities of the online visitor on the website.

3. The method of claim 1, wherein inputting an entry in a data field based on the current activity of the online visitor comprises dislodging an earliest entry in the data field if the data field comprises the respective fixed number of entries prior to the inputting of the entry in the data field.

4. The method of claim 1, wherein the current activity of the online visitor on the website comprises performing at least one of opening a web page, closing the web page, viewing content pieces related to a product, adding the product to a shopping cart, purchasing the product, accepting an offer for a chat invitation with a customer support representative and engaging in a chat interaction with the customer support representative.

5. The method of claim 1, wherein at least one attribute from among the plurality of attributes is defined corresponding to a visitor activity from among initiating a browsing session on the website, conducting a purchase on the website, uploading a cart on the website, receiving a proactively offered chat invitation for chatting with a customer support representative on the website and accepting the chat invitation on the website.

6. The method of claim 1, wherein at least one attribute from among the plurality of attributes is defined to facilitate capture of entries related to device related information and personal information associated with the online visitor.

7. The method of claim 1, wherein an intention from among the at least one intention predicted for the online visitor corresponds to an outcome related to one of a propensity of the online visitor to engage in a chat interaction, a propensity of the online visitor to make a purchase on the website and a propensity of the online visitor to purchase a specific product displayed on the website.

8. An apparatus, comprising:
at least one processor; and
a memory having stored therein machine executable instructions, that when executed by the at least one processor, cause the apparatus to:
 detect a website access event indicating an access of a website by an online visitor;
 generate a visitor profile for the online visitor upon detecting the website access event, the visitor profile generated by:
  defining a plurality of attributes related, at least in part, to visitor activities on the website, wherein at least one attribute is defined to facilitate capture of information which is not related to visitor activities on the website; and
  allocating a data field to each attribute from among the plurality of attributes to configure the visitor profile comprising a plurality of data fields, each data field capable of accommodating a respective fixed number of entries, the fixed number of entries for the each data field determined based on a respective temporal threshold value computed to determine a number of entries required for storing of information related to one or more past activities of the online visitor on the website that are relevant to a current activity of the online visitor on the website; and
  computing a mean value and a standard deviation value from a statistical distribution of entries corresponding to the each attribute, the statistical distribution of entries related to one or more visits to the website by a plurality of online visitors, wherein the temporal threshold value is computed based on the mean value and the standard deviation value;
 dynamically update the visitor profile based on the current activity of the online visitor on the website, wherein dynamically updating the visitor profile comprises inputting at least one entry in one or more data fields from among the plurality of data fields;
 determine a state of the visitor profile at a chosen time instant by transforming entries in the plurality of data fields associated with the state of visitor profile to generate a plurality of feature vectors;
 provision the plurality of feature vectors to at least one classifier associated with intention prediction to facilitate prediction of the at least one intention of the online visitor;
 predict at least one intention of the online visitor based on a state of the visitor profile selected at a chosen time instant during the current activity of the online visitor on the website;
 determine a score based on said predicted intention; and
 when the score based on the predicted intention is greater than a pre-determined threshold value modify the experience of the website online visitor while the online visitor is visiting the website by determining one or more recommendations based on the predicted intention of the visitor, wherein said recommendations determined comprise offering suggestions to a customer support representative to address concerns of the visitor during a chat interaction, routing the chat interaction to a customer support representative suited to address the concerns of the visitor, displaying content relevant to a current activity of the visitor on a website, displaying at least one of a pop-up and a widget with content suited to assist the visitor in making a purchase, and addressing a query on the website.

9. The apparatus of claim 8, wherein at least one data field from among the plurality of data fields of the generated visitor profile comprises one or more entries for a corresponding attribute based on the one or more past activities of the online visitor on the website.

10. The apparatus of claim 8, wherein inputting an entry in a data field based on the current activity of the online visitor comprises dislodging an earliest entry in the data field if the data field comprises the respective fixed number of entries prior to the inputting of the entry in the data field.

11. The apparatus of claim 8, wherein the current activity of the online visitor on the website comprises performing at least one of opening a web page, closing the web page, viewing content pieces related to a product, adding the product to a shopping cart, purchasing the product, accepting an offer for a chat invitation with a customer support representative and engaging in a chat interaction with the customer support representative.

12. The apparatus of claim 8, wherein at least one attribute from among the plurality of attributes is defined corresponding to a visitor activity from among initiating a browsing session on the website, conducting a purchase on the website, uploading a cart on the website, receiving a proactively offered chat invitation for chatting with a customer support representative on the website and accepting the chat invitation on the website.

13. The apparatus of claim 8, wherein at least one attribute from among the plurality of attributes is defined to facilitate capture of entries related to device related information and personal information associated with the online visitor.

14. The apparatus of claim 8, wherein an intention from among the at least one intention predicted for the online visitor corresponds to an outcome related to one of a propensity of the online visitor to engage in a chat interaction, a propensity of the online visitor to make a purchase on the website and a propensity of the online visitor to purchase a specific product displayed on the website.

* * * * *